(12) United States Patent
Yamaguchi (10) Patent No.: US 8,308,353 B2
(45) Date of Patent: Nov. 13, 2012

(54) EAR THERMOMETER AND METHOD OF MANUFACTURING EAR THERMOMETER

(75) Inventor: Keiji Yamaguchi, Fujinomiya (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 562 days.

(21) Appl. No.: 12/538,414

(22) Filed: Aug. 10, 2009

(65) Prior Publication Data

US 2009/0296775 A1    Dec. 3, 2009

(30) Foreign Application Priority Data

Mar. 26, 2007  (JP) ................ 2007-080125
Mar. 26, 2007  (JP) ................ 2007-080126

(51) Int. Cl.
 *G01J 5/02*  (2006.01)
(52) U.S. Cl. ......... 374/121; 374/208; 600/549; 600/474
(58) Field of Classification Search .......... 374/120–132, 374/100, 208; 600/474, 549; 702/130, 131
See application file for complete search history.

(56) References Cited

U.S. PATENT DOCUMENTS

| 5,018,872 | A | 5/1991 | Suszynski et al. | |
|---|---|---|---|---|
| 5,874,736 | A | 2/1999 | Pompei | |
| 7,434,991 | B2 * | 10/2008 | Harr et al. | 374/121 |
| 7,787,938 | B2 * | 8/2010 | Pompei | 600/474 |
| 7,988,352 | B2 * | 8/2011 | Lin et al. | 374/121 |
| 2003/0016728 | A1 * | 1/2003 | Gerlitz | 374/121 |
| 2005/0018749 | A1 * | 1/2005 | Sato et al. | 374/121 |
| 2006/0050769 | A1 * | 3/2006 | Lee | 374/208 |
| 2006/0098709 | A1 * | 5/2006 | Huang et al. | 374/121 |
| 2007/0206657 | A1 * | 9/2007 | Lin et al. | 374/208 |
| 2007/0211783 | A1 * | 9/2007 | Huang et al. | 374/121 |
| 2008/0298429 | A1 * | 12/2008 | Harr | 374/121 |

FOREIGN PATENT DOCUMENTS

JP    11-123179 A    5/1999

* cited by examiner

*Primary Examiner* — Gail Verbitsky
(74) *Attorney, Agent, or Firm* — Buchanan Ingersoll & Rooney PC (57) ABSTRACT

An ear thermometer which includes a temperature detection element and infrared detection element arranged near the opening portion of a probe achieves a reduction in manufacturing cost while reducing the influence of thermal shock. This invention provides an ear thermometer incorporating, in a probe, a temperature detection element to detect an environmental temperature and an infrared detection element to detect infrared radiation emitted from a temperature measurement region in an earhole. The probe includes an end face portion having an opening in its distal end, an inner surface portion of a hollow cylindrical member, and an inwardly protruding engaging portion. A detection element housing is fixed to close the opening of the probe and to form an air layer between the detection element housing and the probe.

13 Claims, 10 Drawing Sheets

EAR THERMOMETER AND METHOD OF MANUFACTURING EAR THERMOMETER

BACKGROUND OF THE INVENTION

1. Field of the Invention

The present invention relates to an ear thermometer and a method of manufacturing an ear thermometer.

2. Description of the Related Art

An ear thermometer in practical use includes a temperature detection element (e.g., a thermistor) to detect an environmental temperature and an infrared detection element (e.g., a thermopile including a cold junction and a hot junction) to detect infrared radiation emitted from a temperature measurement region in the earhole, and measures the body temperature of an object based on the detection result obtained by each detection element.

For example, the present applicant has commercialized an ear thermometer which has a thermistor and a thermopile respectively arranged at positions spaced apart from the distal end of a probe (a portion to be inserted into the earhole) and measures the body temperature of an object by guiding infrared radiation incident through the opening portion of the probe by using a light guide (Japanese Patent Laid-Open No. 11-123179).

Arranging the thermistor and the thermopile at positions spaced apart from the distal end of the probe in this manner can reduce the outer diameter of the distal end of the probe. This facilitates the insertion of the probe into the earhole. Even if the body temperature of an object conducts to the distal end of the probe upon insertion into the earhole, this arrangement can minimize the influence of thermal shock accompanying the heat conduction.

On the other hand, when a thermistor and a thermopile are arranged at positions spaced apart from the distal end of a probe, and infrared radiation is guided by using a light guide, the number of components increases, and the number of manufacturing steps increases. This inevitably increases the cost.

In this background, demands have arisen for the implementation of an ear thermometer which can reduce the cost by arranging a temperature detection element and an infrared detection element near the opening portion of a probe while suppressing increases in the outside dimensions of the distal end of the probe and minimizing the influence of thermal shock accompanying heat conduction.

SUMMARY OF THE INVENTION

The present invention has been made in consideration of the above problems.

An ear thermometer according to the present invention has the following arrangement. That is, there is provided an ear thermometer which incorporates, in a probe, a detection element housing accommodating a temperature detection element configured to detect an environmental temperature and an infrared detection element configured to detect infrared radiation emitted from a temperature measurement region in an earhole and measures a body temperature based on detection results obtained by the two detection elements, the probe including an end face portion having an opening and forming a distal end portion, an inner surface portion which is formed by a hollow cylindrical member and forms a side surface portion, and an engaging portion inwardly protruding from the inner surface portion, the detection element housing including a mounting base member on which the two detection elements are fixed, a cylindrical container member which includes a hole formed on the opening side to face the infrared detection element, is fixed to the mounting base member, and surrounds the two detection elements, and a window member which is attached to the hole, closes the hole, and transmits infrared radiation, wherein one of the window member and the container member of the detection element housing is in contact with a surface of the detection element side of the end face portion so as to close the opening of the probe, and an air layer is formed between an outer surface of the detection element housing and the inner surface portion of the probe by fixing the mounting base member by engaging the mounting base member with the engaging portion.

The present invention can implement an ear thermometer which can reduce the cost by arranging a temperature detection element and an infrared detection element near the opening portion of a probe while suppressing increases in the outside dimensions of the distal end of the probe and minimizing the influence of thermal shock accompanying heat conduction.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

First Embodiment

<Outer Arrangement of Ear Thermometer>

Figure 1A:
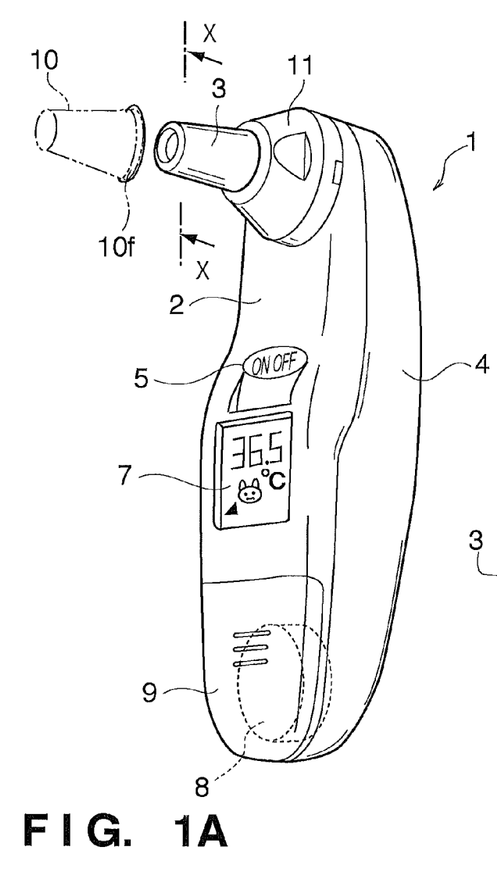
FIG. 1A is respectively an outer perspective view of an ear thermometer 1 according to an embodiment of the present invention when viewed from the probe side and FIG. 1B is an outer perspective view of the ear thermometer 1 when viewed from the operation switch side.
Figure 1B:
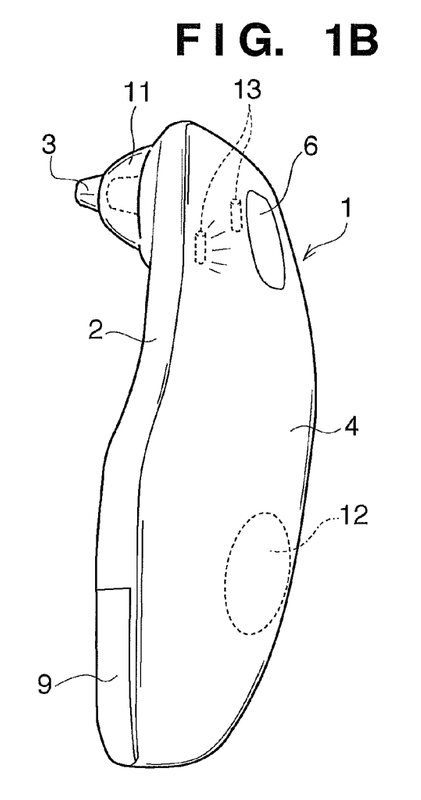

FIG. 1A is an outer perspective view of an ear thermometer 1 according to an embodiment of the present invention when viewed from the probe side and FIG. 1B is an outer perspective view of the ear thermometer 1 when viewed from the side of an operation switch 6.

The ear thermometer 1 is configured to be separated into two components including a main body base 2 injection-molded from a predetermined resin material and a main body case 4. A mounting board (to be described later) is fixed inside the ear thermometer 1.

The main body base 2 and the main body case 4 are molded from resin materials colored in different colors. The main body case 4 is, in particular, molded from a translucent resin material. This allows a user to externally see the blinking states of two LED elements 13 provided inside through the main body case 4.

Note that resin materials which can be used for the main body case 4 are, for example, so-called engineering plastics including polyolefins such as polyethylene, polypropylene, and an ethylene-vinyl acetate copolymer, and polyesters such as polyethylene terephthalate and polybutyrene terephthalate.

A probe 3 is inserted into the earhole (external auditory canal) to detect infrared radiation emitted from a temperature measurement region (preferably the drum membrane and/or its periphery, in particular) inside the earhole. The probe 3 has a conical-cylindrical shape having a distal end whose outer diameter is about 7 mm, and is integrally molded with the main body base 2. Note that it is possible to prepare the probe 3 as a component independent of the main body base 2.

As shown in FIG. 1A, the probe 3 is detachably provided with a probe cover 10 (see the chain lines) having the same shape as that of part of the probe 3. The probe cover 10 prevents earwax and foreign substances from entering the opening portion of the probe 3. Assume that the probe cover 10 is configured to be detachable to maintain its sanitary condition by periodic washing with water. Assume also that the probe cover 10 is formed by vacuum-molding a transparent vinyl material so as to have a predetermined thickness (e.g., about 0.1 to 0.005 mm). However, the material for the probe cover 10 is not limited to this, and the cover may be molded by using another kind of resin material.

In addition, as shown in FIG. 1A, a flange portion 10f is integrally molded with a base portion of the probe cover 10. As will be described later, sandwiching the flange portion 10f between the probe cover 10 and a probe cover attachment 11 allows the probe cover 10 to be detachably attached to the probe 3. Note that as shown in FIG. 1A, the probe cover attachment 11 has a diameter larger than that of the proximal portion of the probe 3, and has a tapered shape. This prevents the probe 3 from being excessively inserted into the earhole.

A power supply switch 5 which is pressed/operated is provided below the probe 3. In addition, a liquid crystal display device 7 is provided below the power supply switch 5. The liquid crystal display device 7 displays a measured body temperature in seven segments and also displays a character such as a pictogram indicating that the ear thermometer is ready for measurement. A button battery cover 9 is provided below the liquid crystal display device 7. The button battery cover 9 is detachably attached to the main body base 2 to allow the replacement of a button battery 8 (see the broken lines).

Furthermore, as shown in FIG. 1B, the main body case 4 is provided with a measurement switch 6 at a position on almost the rear surface side of the probe 3. In addition, a piezoelectric speaker 12 indicated by the broken line in FIG. 1B is fixed to the rear surface side of the main body case 4.

<Internal Arrangement of Ear Thermometer>

Figure 2:
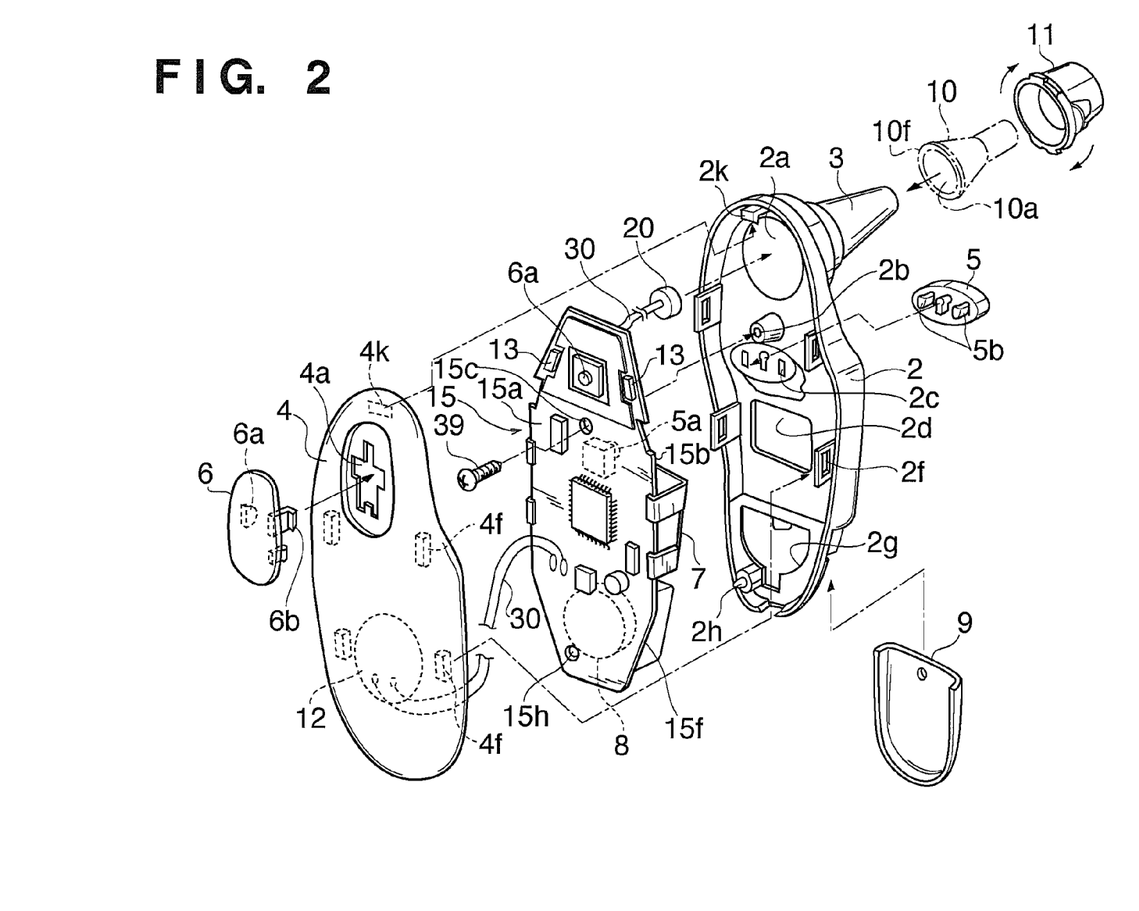
FIG. 2 is an exploded perspective view of the ear thermometer 1 shown in FIGS. 1A and 1B.

The internal arrangement of the ear thermometer will be described next. FIG. 2 is an exploded perspective view of the ear thermometer 1. In description of the exploded perspective view of FIG. 2, the same reference numerals as in FIG. 1A and FIG. 1B denote configurations or components FIG. 1A and FIG. 1B which has already been described, and a repetitive description will be omitted.

As shown in FIG. 2, the main body case 4 has a hole portion 4a for fixing the measurement switch 6. The measurement switch 6 is fixed to the main body case 4 by inserting a pair of pawl portions 6b formed on the measurement switch 6 into the hole portion 4a and respectively engaging the pawl portions 6b with rear surface edge portions of the hole portion 4a.

Note that the measurement switch 6 is fixed so as to be movable back and forth relative to the main body case 4. This makes it possible to press a mechanical contact type switch 6a including a tact switch mounted on a major mounting surface 15a of a mounting board 15.

A piezoelectric speaker 12 (see the broken line) is fixed to the rear surface of the main body case 4. The piezoelectric speaker 12 is connected to the major mounting surface 15a of the mounting board 15 via wiring lines 30.

Four projection portions 4f indicated by the broken lines in FIG. 2 are arranged near edge portion of the inner surface of the main body case 4 at symmetrical positions. A locked portion 4k is formed on an upper portion of the main body case 4.

On the other hand, the main body base 2 has an edge portion with the same shape as that of the edge portion of the main body case 4. Four recess portions 2f in which the four projection portions 4f are respectively fitted are formed on the edge portion of the main body base 2 at positions corresponding to the projection portions 4f. In addition, a locking portion 2k to which the locked portion 4k is locked is integrally formed with an upper portion of the main body base 2.

With the above arrangement, the main body base 2 and the main body case 4 can be assembled by locking the locked portion 4k of the main body case 4 to the locking portion 2k first, and then engaging the projection portions 4f with the recess portions 2f.

The mounting board 15 has an outer shape conforming to the side wall portion of the main body base 2, and is fixed to the inside of the main body base 2. Various kinds of electronic components such as a CPU element are mounted on the major mounting surface 15a of the mounting board 15 in addition to the LED elements 13. A mechanical switch 5a indicated by the broken lines, the liquid crystal display device 7, and a battery box in which the button battery 8 is set are mounted on a sub mounting surface 15b which is the rear surface side of the mounting board 15. Note that the sub mounting surface 15b is connected to a detection element housing 20 (to be described later) via the wiring lines 30.

A screw hole portion 15c and a fixing hole portion 15h are respectively formed in the mounting board 15 at the positions shown in FIG. 2 to fix the mounting board 15 to the main body base 2. On the other hand, stud portions 2b and 2h are integrally molded with the main body base 2 at positions corresponding to the screw hole portion 15c and the fixing hole portion 15h, respectively. This makes it possible to fix the mounting board 15 to the main body base 2 by setting the screw hole portion 15c and the fixing hole portion 15h so as to make them match the stud portions 2b and 2h of the main body base 2, and threadably engaging a screw 39 with the stud portion 2b.

The main body base 2 and the probe 3 are integrally molded as described above, and the main body base 2 has an opening portion 2a communicating with the inner surface of the probe 3.

A recess portion having hole portions 2c for fixing the power supply switch 5 is formed in the main body base 2. The power supply switch 5 is fixed by inserting a pair of pawl portions 5b formed on the power supply switch 5 into the hole portions 2c, and locking the pawl portions 5b to the rear surface edge portions of the hole portions 2c.

The power supply switch 5 is configured to be movable back and forth relative to the main body base 2. When the power supply switch 5 moves forward, it presses the mechanical switch 5a which is a tact switch mounted on the sub mounting surface 15b of the mounting board 15.

In addition, an opening portion 2d is formed in the main body base 2 at a position corresponding to the display surface of the liquid crystal display device 7. The main body base 2 also has an opening portion 2g (an opening portion larger than the outside dimension of the button battery 8) to allow the replacement of the button battery 8 described above. The button battery cover 9 is slidably attached to the opening portion 2g.

The probe cover 10 is detachably attached to the probe 3. More specifically, the probe cover 10 is detachably fixed to the probe 3 by moving the probe cover 10 in the arrow direction to cover the probe 3, then fitting the probe cover attachment 11 on the probe cover 10, and rotating the probe cover attachment 11 in the arrow direction.

<Attachment Procedure for Probe Cover>

Figure 3:
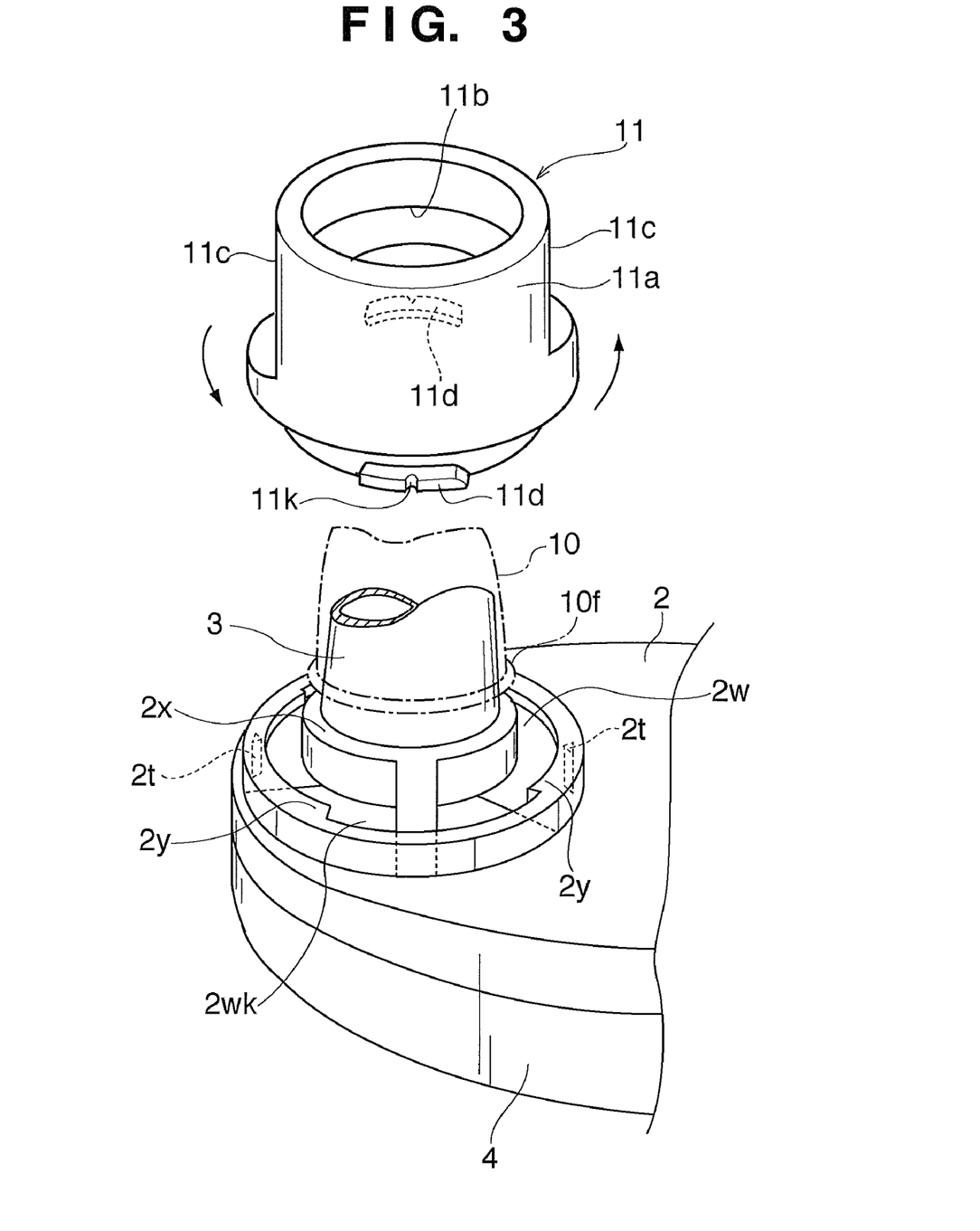
FIG. 3 is a perspective view for explaining the operation of a probe cover attachment 11 for attaching a probe cover 10.

FIG. 3 is a view for explaining an attachment procedure for detachably attaching the probe cover 10.

As shown in FIG. 3, the probe cover attachment 11 is formed from a cylindrical member, and internally has a stepped portion 11b which comes into contact with the flange portion 10f of the probe cover 10 (indicated by the chain line in FIG. 3) to prevent the removal of the probe cover 10. In addition, the outer surface of the probe cover attachment 11 is provided with a grip portion 11c to allow the user to grip the probe cover attachment 11 with fingertips. The user grips the grip portion 11c to rotate the probe cover attachment 11 in the arrow direction in FIG. 3.

In addition, the outer surface of the probe cover attachment 11 is provided with locking projection portions 11d (one of which is indicated by the broken lines in FIG. 3). Note that a locking groove portion 11k is formed in the middle portion of each locking projection portion 11d.

A stepped portion 2x concentric with the probe 3 is integrally molded with the main body base 2 at a position corresponding to the proximal end portion of the probe 3. The stepped portion 2x comes into contact with the lower surface of the flange portion 10f of the probe cover 10 (indicated by the chain line in FIG. 3). Inner collar portions 2y are integrally molded with the main body base 2 concentrically with the probe 3 so as to surround the stepped portion 2x through a space portion 2w. Projections 2t are formed on the middle portions of the inner collar portions 2y. The projections 2t engage with the locking groove portions 11k formed in the middle portions of the locking projection portions 11d.

With the above arrangement, the user can lock the locking groove portions 11k formed in the middle portions of the locking projection portions 11d to the projections 2t, respectively, by moving the probe cover attachment 11 downward while gripping the grip portion 11c after fitting the probe cover 10 on the probe 3, inserting the locking projection portions 11d (one of which is indicated by the broken lines in FIG. 3) into a large-diameter space portion 2wk between the inner collar portions 2y, and then pivoting the probe cover attachment 11 in the counterclockwise direction. As a result, the probe cover attachment 11 is detachably attached to the probe 3.

<Internal Arrangement of Probe>

Figure 4:
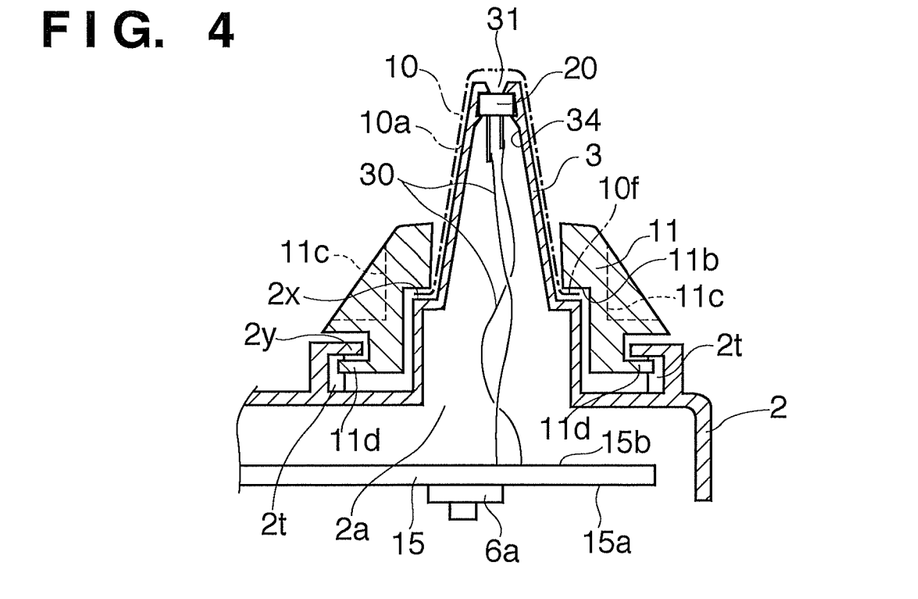
FIG. 4 is a sectional view taken along a line X-X in FIG. 1A after the probe cover 10 is attached.

FIG. 4 is a sectional view of the probe 3 (taken along a line X-X in FIG. 1A) after the probe cover 10 is attached to the probe 3 by the above operation.

As shown in FIG. 4, the lower surface of the flange portion 10f of the probe cover 10 (indicated by the chain line in FIG. 4) comes into contact with the stepped portion 2x, and the upper surface of the flange portion 10f comes into contact with the stepped portion 11b of the probe cover attachment 11. With this operation, the probe cover 10 is vertically clamped. Note that when the probe cover 10 is to be removed for, for example, washing with water, the user reverses the above procedure.

As shown in FIG. 4, the probe 3 includes an end face portion having an opening portion 31 formed in its distal end and a hollow cylindrical member. The inner surface portion of the hollow cylindrical member is formed to make the opening portion 31 communicate with the opening portion 2a of the main body base 2.

The detection element housing 20 is fixed to the distal end of the probe 3. The detection element housing 20 is directly connected to the mounting board 15 via the wiring lines 30 (or connected to the mounting board 15 via a connector (not shown)).

In this case, since the distal end portion of the probe 3 is inserted into the external ear, it has an outer diameter of about 7 mm. In addition, to fix the detection element housing 20 at the position shown in FIG. 4, the detection element housing 20 has an outer diameter of, for example, about 5 mm. The detection element housing 20 has a height of about 4 mm.

<Arrangement of Detection Element Housing>

Figure 5:
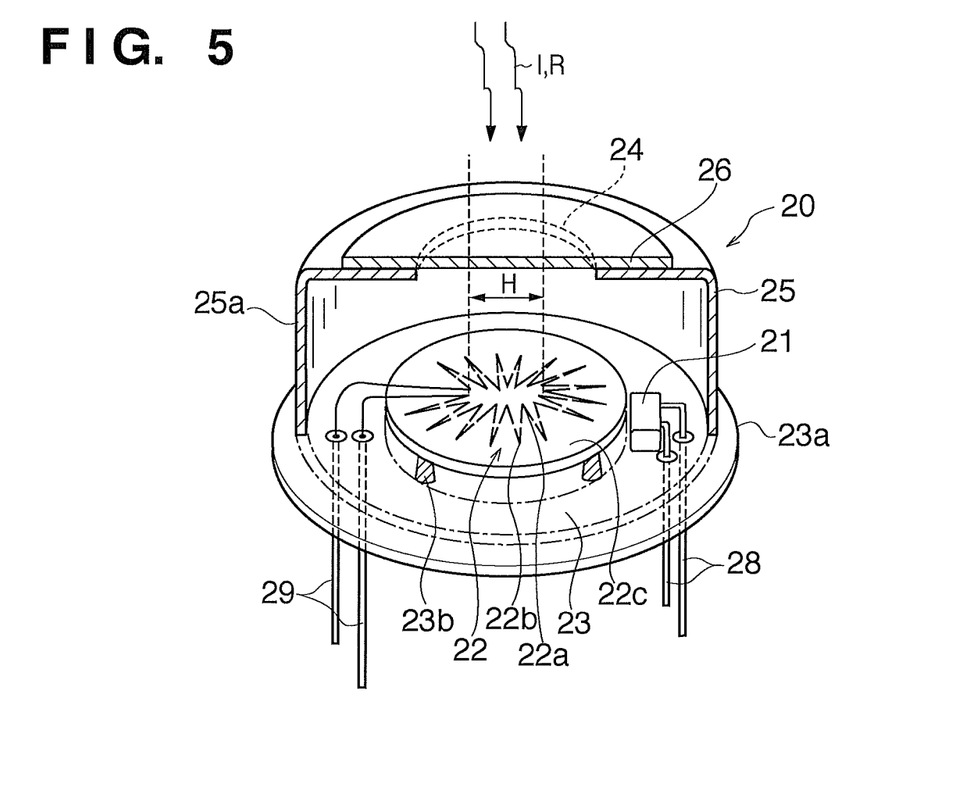
FIG. 5 is a partially cutaway outer perspective view of a detection element housing 20.

FIG. 5 is an outer perspective view of the detection element housing 20 with a part cut away. As shown in FIG. 5, the detection element housing 20 includes a mounting base member 23. A thermistor 21 and an infrared detection element 22 are fixed on the mounting base member 23. The thermistor 21 is a temperature detection element to detect an environmental temperature. The infrared detection element 22 detects infrared radiation emitted from a temperature measurement region in the earhole.

The thermistor 21 is adjusted to measure an absolute temperature as an operating environmental temperature. In addition, the mounting base member 23 is formed from a good heat conductor such an aluminum material to transfer the outdoor air temperature to the thermistor 21. The thermistor 21 is fixed to the mounting base member 23 so as to make the mounting surface have a large surface area.

In addition, electrode leads 28 are attached to the thermistor 21 to output measurement results.

On the other hand, the infrared detection element 22 to detect infrared radiation IR is adjusted to detect a relative temperature.

As described above, the ear thermometer calculates the body temperature of an object by adding the detected temperature detected by the infrared detection element to the detected temperature detected by the temperature detection element. Note that since this calculation processing is described in detail in, for example, Japanese Patent Laid-Open No. 11-123179, a repetitive description is omitted.

The ear thermometer according to this embodiment uses a thermoelectric pile type (thermopile type) detection element as the infrared detection element 22. As shown in FIG. 5, therefore, a petal-like hot junction 22a and a cold junction 22b are formed on a wafer carrier 22c fixed on a seat 23b of the mounting base member 23. The hot junction 22a and the cold junction 22b are made of different kinds of metals and are connected in series. Electrode leads 29 are connected to the respective junctions.

Assume that a range H surrounded by the hot junction 22a is painted in black to facilitate the absorption of infrared radiation.

With this arrangement, the infrared detection element 22 detects a relative temperature based on the electromotive force generated between the respective junctions.

The detection element housing 20 includes a cylindrical container member 25 formed to surround the two detection elements. The container member 25 includes an outer surface 25a and a ceiling surface having a hole 24.

Like the mounting base member 23, the container member 25 is formed from a good heat conductor such as an aluminum or stainless steel material, and is configured to easily transfer the outdoor air temperature to the thermistor 21. A window member 26 made of a silicon which transmits infrared radiation is fixed in the hole 24.

Assume that in the case of the detection element housing 20 shown in FIG. 5, an outer collar portion 23a radially extends from the edge portion of the mounting base member 23 (the function of the outer collar portion 23a will be described later).

<Operation Procedure for Measurement of Body Temperature by Ear Thermometer>

Figure 6:
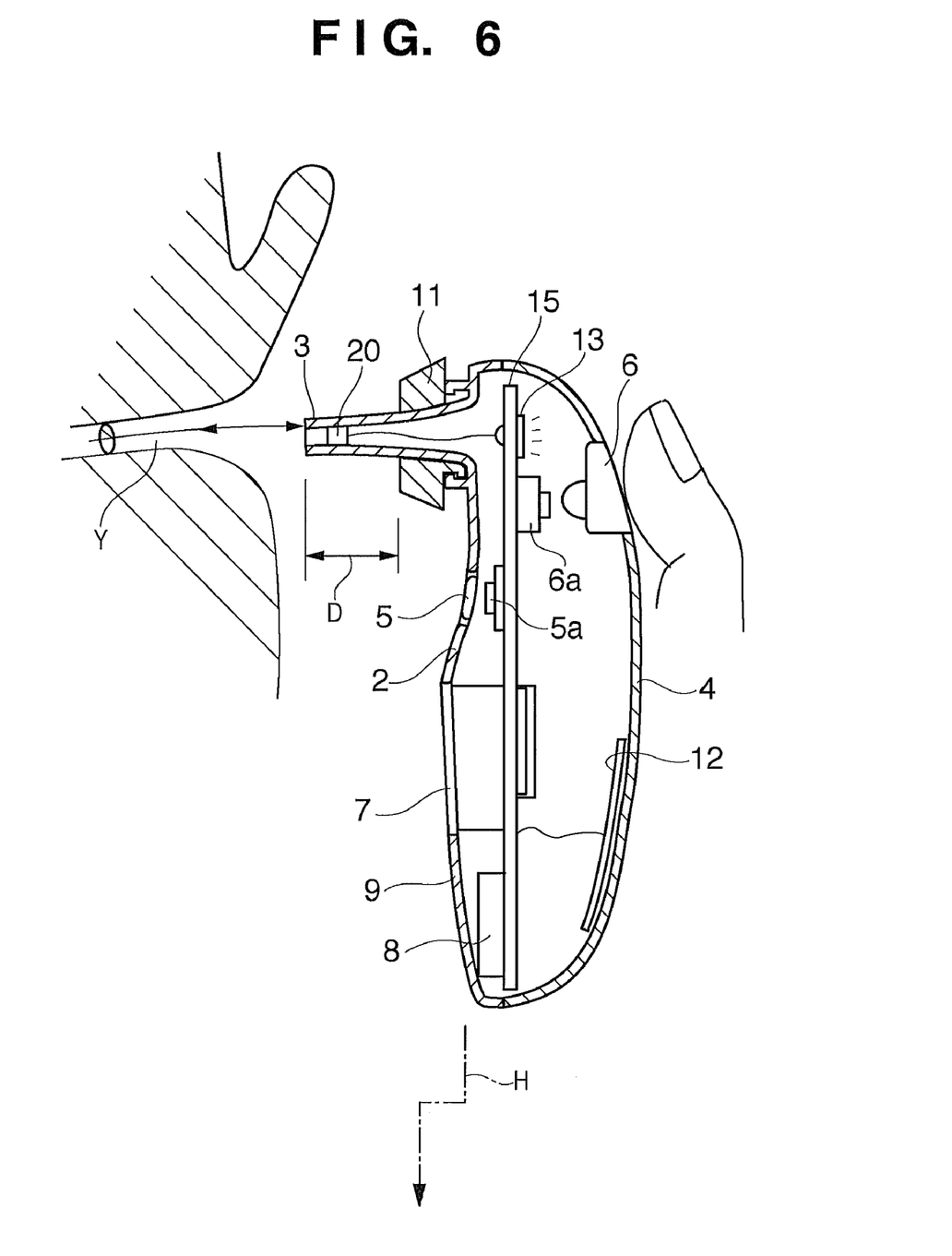
FIG. 6 is a sectional view showing how the ear thermometer 1 is inserted into a measurement region.

An operation procedure for the measurement of a body temperature by the ear thermometer 1 will be described next. FIG. 6 is a sectional view showing how the ear thermometer 1 is inserted into an earhole Y as a measurement region. Note that the same reference numerals as in FIG. 6 denote configurations or components in FIG. 6 which have already been described, and a repetitive description will be omitted.

When the user turns on the power supply switch 5, he/she waits until the thermistor 21 detects an environmental temperature. The liquid crystal display device 7 displays this wait time as a time until a pictogram is completed.

When the wait time has elapsed, the user inserts the probe 3 into the earhole Y, as shown in FIG. 6. Note that at this time, the user does not insert the probe 3 into the earhole to a depth larger than the distance D between the probe cover attachment 11 and the distal end of the probe.

After inserting the probe 3, the user turns on the measurement switch 6. Since the measurement switch 6 is provided on the side opposite to the probe 3, the user can easily grasp the insertion position of the probe 3 even when he/she measures his/her body temperature by himself/herself (i.e., user=object).

When the user turns on the measurement switch 6, the LED elements 13 are sequentially turned on. The speaker 12 then outputs a beep tone. Outputting the beep tone makes the user recognize the end of the measurement. Upon recognizing the end of the measurement, the user removes the probe 3 from the earhole and reads the body temperature value displayed on the liquid crystal display device 7. With this, the operation for the measurement of a body temperature is complete.

Note that if the user keeps not doing body temperature measuring operation after turning on the power supply switch 5, the power supply is automatically turned off. This prevents unnecessary consumption of battery power.

<Functional Arrangement of Ear Thermometer>

Figure 7:
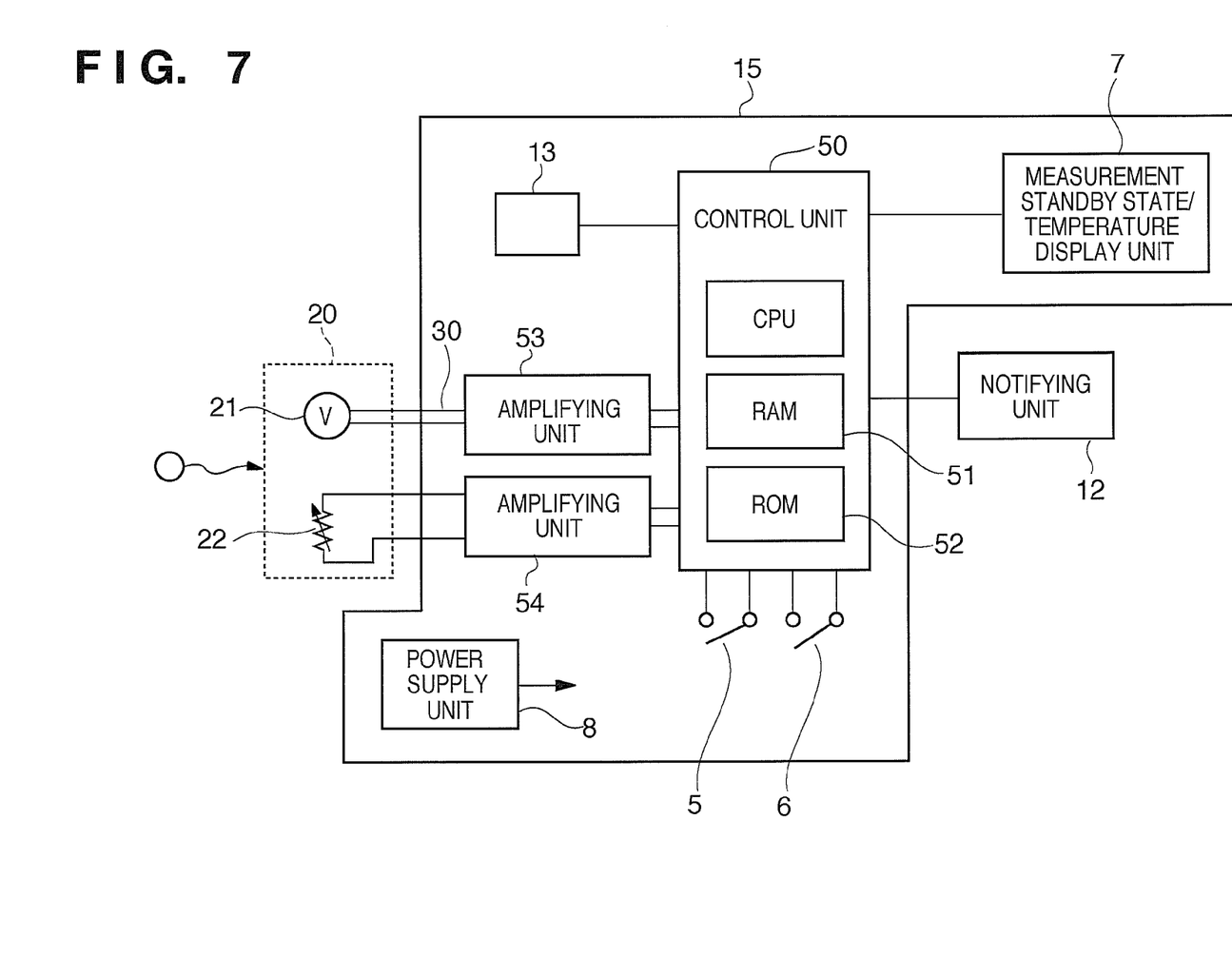
FIG. 7 is a block diagram of the ear thermometer 1.

The functional arrangement of the ear thermometer will be described with reference to FIG. 7. FIG. 7 is a block diagram of the ear thermometer 1. Note that the same reference numerals as in FIG. 7 denote configurations or components in FIG. 7 which have already been described, and a detailed description will be omitted.

As shown in FIG. 7, the thermistor 21 incorporated in the detection element housing 20 is connected to an amplifying unit 53 on the mounting board 15 via the wiring lines 30. The infrared detection element 22 to detect the infrared radiation IR is connected to an amplifying unit 54 on the mounting board 15 via the wiring lines 30.

A control unit 50 provided on the mounting board 15 includes a CPU, and a RAM 51 and a ROM 52 which are storage elements. The LED elements 13, the liquid crystal display device 7, the speaker 12 (notifying unit), the power supply switch 5, and the measurement switch 6 are connected to the control unit 50. Assume that the control unit 50 operates upon receiving power supplied from the power supply unit 8 as a button battery.

<Attachment Process for Detection Element Housing>

An attachment process for attaching the detection element housing 20 to the distal end portion of the probe 3 will be described next.

Figure 8A:
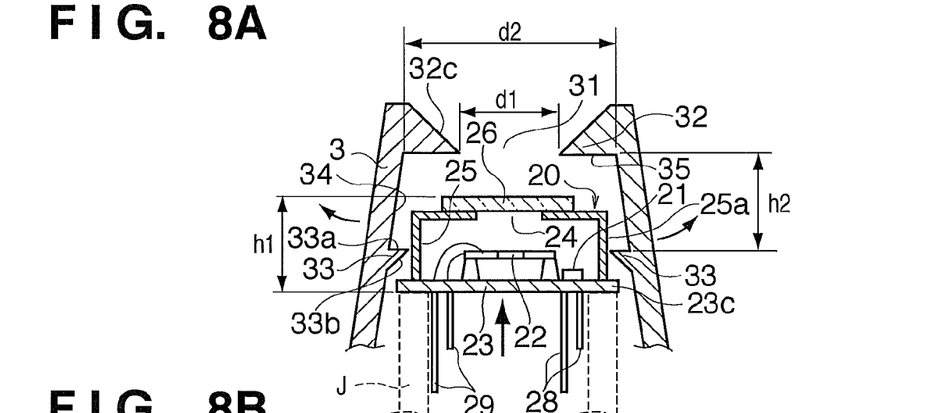
FIGS. 8A to 8C are views for explaining a structure and process for fixing the detection element housing to the probe.
Figure 8B:
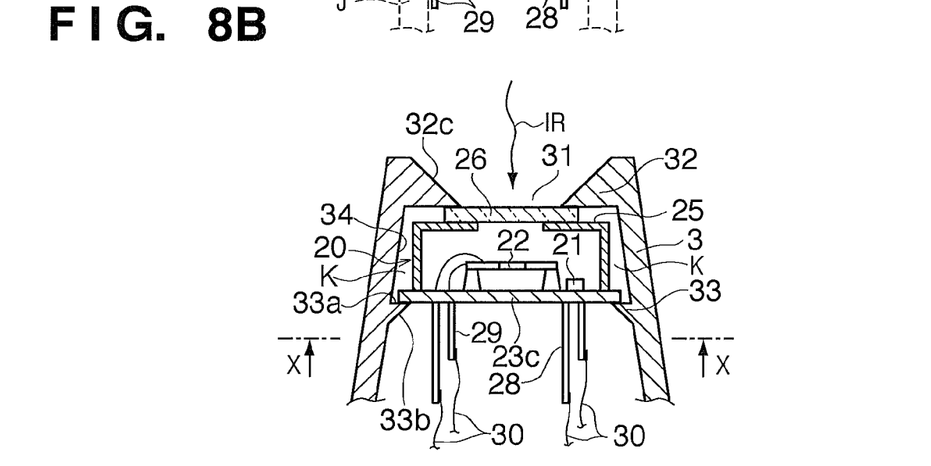
Figure 8C:
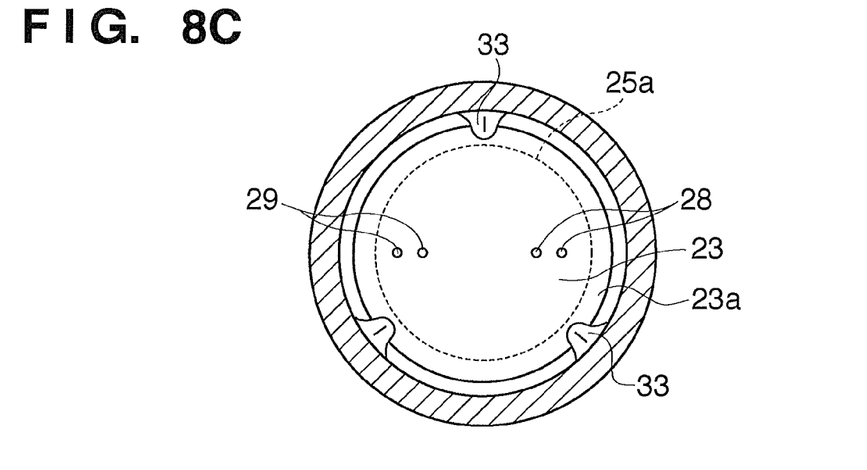

FIGS. 8A to 8C are views for explaining an attachment process for attaching the detection element housing 20 to the distal end portion of the probe 3 so as to close the opening of the distal end portion. Note that the same reference numerals as in FIGS. 8A to 8C denote configurations or components in FIGS. 8A to 8C which have already been described, and a detailed description will be omitted.

An annular end face portion 32 is formed on the distal end of the probe 3 along the inner surface with inner diameter d2=about 5 mm. The end face portion 32 has a chamfered portion 32c and an inner end face 35. The top part of the chamfered portion 32c defines the opening portion 31 of the probe 3 as a circular shape with diameter=about 3 to 4 mm.

Three engaging portions 33 are formed on the distal end of the probe 3 along its inner surface at 120° intervals. Each engaging portion 33 is positioned such that a distance h2 between an abutment surface 33a and the inner end face 35 of the end face portion 32 becomes almost equal to a height h1 which is the sum of the height of the outer surface 25a of the container member 25 of the detection element housing 20 and the height of the window member 26. Note that the engaging portions 33 can be formed annularly along the inner surface. In addition, the engaging portions 33 need not be formed at 120° intervals, and the number of engaging portions need not be three as long as it is two or more.

With the above arrangement of the distal end of the probe 3, when the detection element housing 20 is to be attached, first of all, the detection element housing 20 having the electrode leads 28 and 29 connected to the interconnections 30 is moved in the arrow direction by using a jig J indicated by the broken lines in FIG. 8A.

With this operation, the corner portions of the container member 25 come into contact with inclined surfaces 33b of the engaging portions 33. When the detection element housing 20 is further moved upward, the outer surface 25a of the container member 25 is guided to the distal end of the engaging portions 33, and the collar portion 23a (see FIG. 5) of the mounting base member 23 comes into contact with the inclined surfaces 33b. When the detection element housing 20 is further moved upward from this state so as to be forcibly inserted into the probe 3, the probe 3 elastically deforms so as to radially expand. As a result, the edge portion of the collar portion 23a is stranded on the inclined surfaces 33b.

While the edge portion of the collar portion 23a is stranded on the inclined surfaces 33b, the surface of the window member 26 of the detection element housing 20 is in contact with the inner end face 35 so as to close the opening portion 31 of the probe 3 (see FIG. 8B), and a rear surface 23c of the mounting base member 23 is engaged with the engaging portions 33 (see FIG. 8C). For this reason, the detection element housing 20 is in a fixed state.

Fixing the detection element housing 20 in the above manner will form an air layer K between an inner surface portion 34 of the probe 3 and the outer surface 25a of the container member 25. In other words, the dimensional relationship between the dimensions of the inner surface portion 34 of the probe 3 and the dimensions of the outer surface 25a of the container member 25 allows the formation of the air layer K.

When the air layer K is formed in this manner, the air layer K functions as a heat insulating layer. This makes it possible to eliminate the influence of thermal shock conducted through the probe which comes into direct contact with the skin.

In addition, it is possible to decrease the numbers of components and steps and reduce the cost by vertically fixing the detection element housing 20 between the opening portion 31 and the engaging portions 33 as described above.

Second Embodiment

In the first embodiment described above, the collar portion has a disk-like shape, and at least two engaging portions 33 are formed along the inner surface. However, the present invention is not limited to this, and can use another arrangement as long as it is configured to engage the engaging portions 33 with the rear surface of the disk-like shape.

Figure 9A:
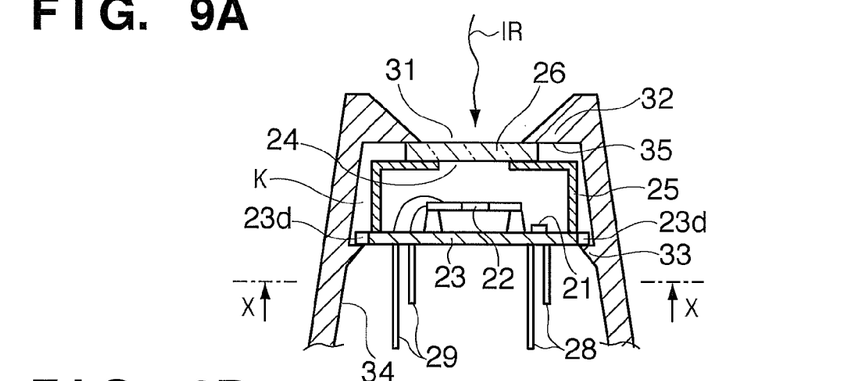
FIGS. 9A and 9B are views for explaining a structure and process for fixing the detection element housing to the probe.
Figure 9B:
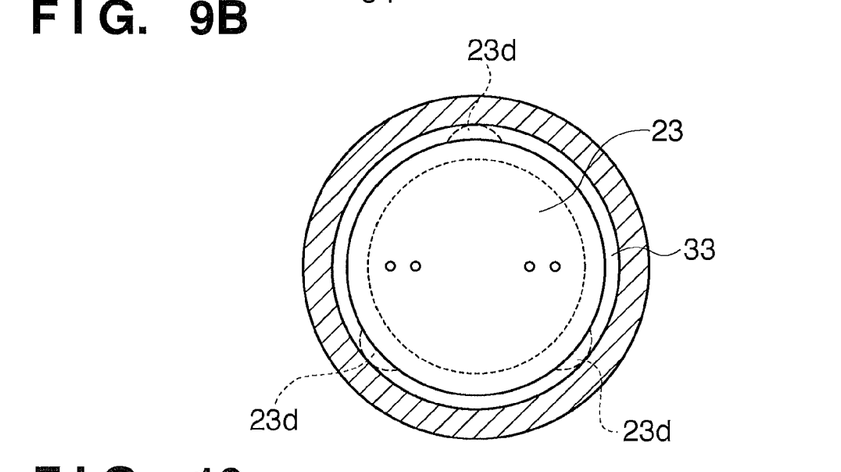

FIGS. 9A and 9B show a state in which an engaging portion 33 is annularly formed along the inner surface of a probe 3, and three projection portions 23d are formed on the edge portion of a mounting base member 23 at 120° intervals so as to radially extend.

As shown in FIG. 9B, this arrangement allows the annular engaging portion 33 formed along the inner surface of the probe 3 to support the projection portions 23d.

Note that the engaging portion 33 can be integrally formed with the probe 3 or can be formed as a separate member and fixed to the probe 3.

Third Embodiment

The first and second embodiments are configured such that the surface of the window member 26 of the detection element housing 20 comes into contact with the inner end face 35 so as to close the opening portion 31 of the probe 3. However, the present invention is not limited to this.

Figure 10:
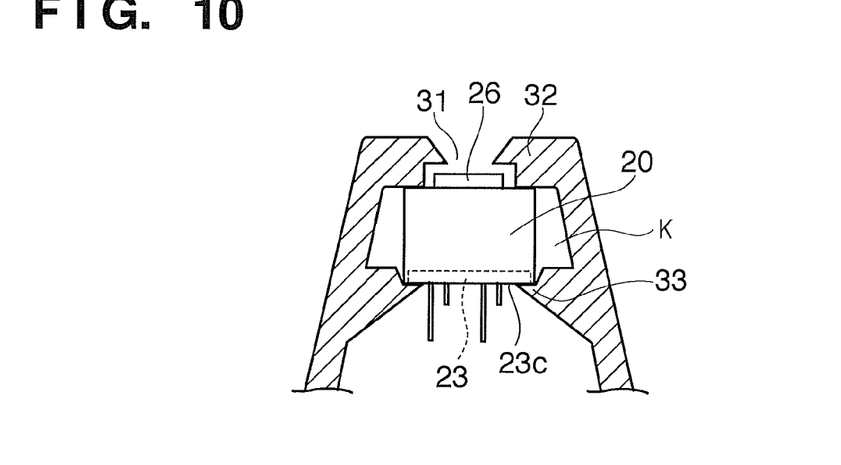
FIG. 10 is a view for explaining a structure and process for fixing the detection element housing to the probe.

FIG. 10 shows a state in which a detection element housing 20 is fixed by bringing a container member 25 of the forcibly inserted detection element housing 20 into contact with an end face portion 32, and engaging a rear surface 23c of a mounting base member 23 with engaging portions 33.

With the arrangement shown in FIG. 10, a window member 26 is positioned in an opening portion 31 without contact with the end face portion 32.

Note that in this arrangement as well, an air layer K is formed to function as a heat insulating layer. It is therefore possible to enjoy the same advantage as that of the first embodiment, that is, being able to eliminate the influence of thermal shock due to heat conduction.

Fourth Embodiment

The first embodiment is configured such that the window member 26 of the detection element housing 20 comes into direct contact with the end face portion 32. However, the present invention is not limited to this.

For example, the window member may come into contact with the end face portion 32 through an O-ring as a seal member.

Figures 11A, 11B:
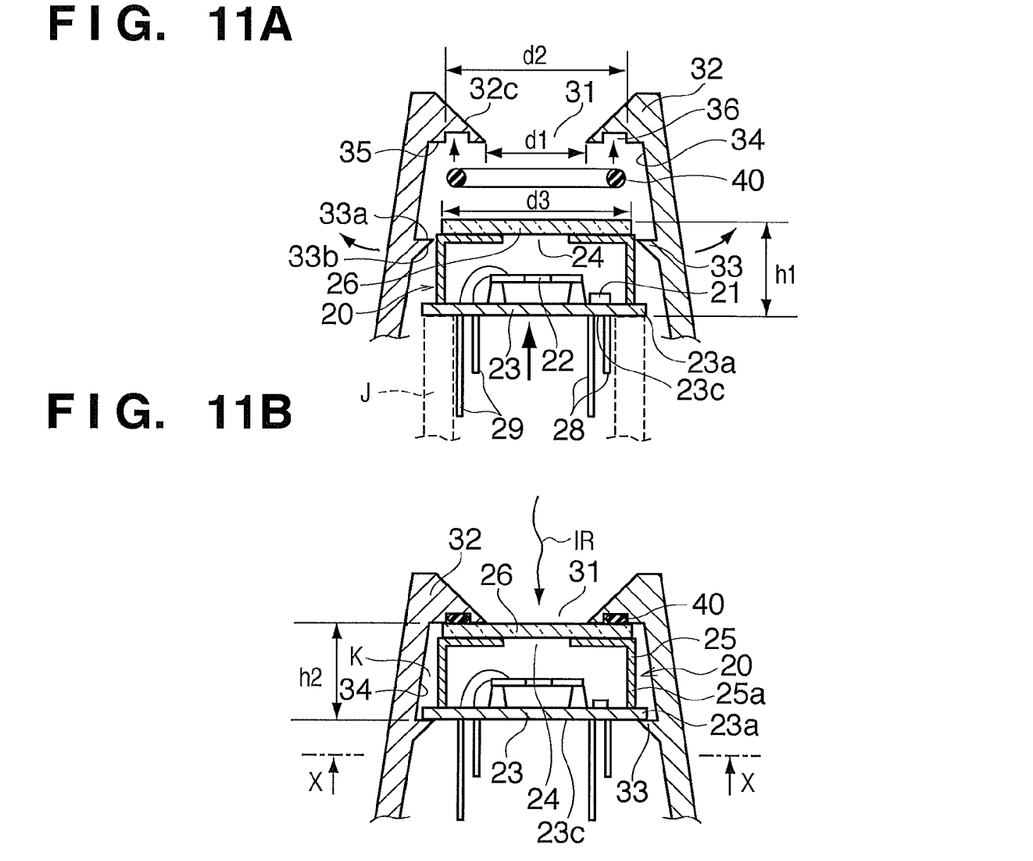
FIGS. 11A to 11C are views for explaining a structure and process for fixing the detection element housing to the probe.
Figure 11C:
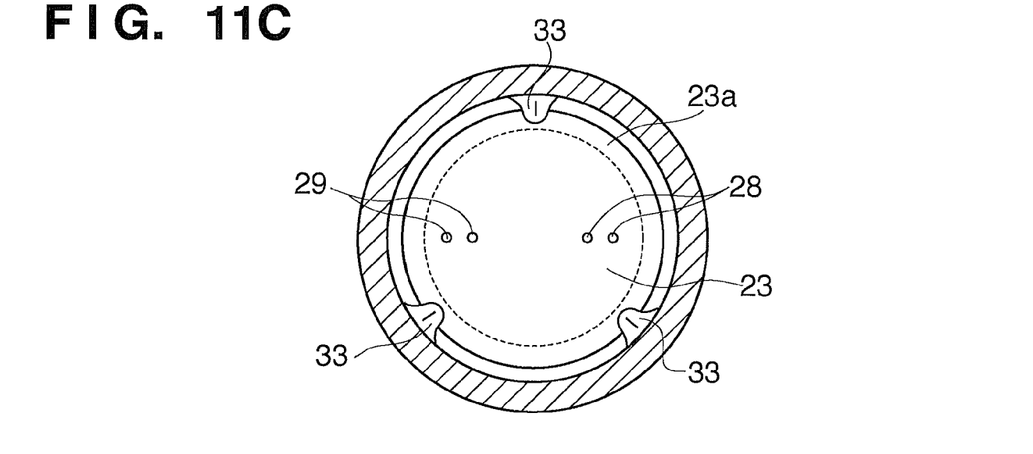

FIGS. 11A and 11B are views for explaining an attachment process for attaching a detection element housing 20 to a probe 3 through an O-ring so as to close the opening of the distal end portion of the probe 3. Note that the same reference numerals as in FIGS. 11A and 11B denote configurations or components in FIGS. 11A and 11B which have already been described, and a detailed description will be omitted.

Referring to FIG. 11A, reference numeral 40 denotes an O-ring (gasket) as a seal member; and 36, a groove portion in which the O-ring 40 is accommodated.

As shown in FIG. 11A, when the detection element housing 20 is to be moved in the arrow direction, the O-ring 40 is accommodated first in the groove portion 36. With this operation, while the detection element housing 20 is fixed (FIG. 11B), the surface of a window member 26 is in contact with the O-ring 40, and hence the O-ring 40 protruding from the groove portion 36 elastically deforms. This makes it possible to hermetically seal a probe 3. The seal member may be an O-ring made of a rubber, an elastomer or a metal. Further, a shape at cross section of the real member may be circular, lozenge, C shape or inverted C shape. Further, the seal member may be liquid adhesion bond which is inserted into the groove portion 36 so as to equally overflow from the groove portion and gets rigid so as to become sealing material.

Fifth Embodiment

In the fourth embodiment, the collar portion has a disk-like shape, and at least two engaging portions 33 are formed along the inner surface. However, the present invention is not limited to this. As in the second embodiment, an engaging portion 33 may be annularly formed along the inner surface, and three projection portions 23d may be formed on the edge portion of a mounting base member 23 at 120° intervals so as to radially extend.

Figure 12A:
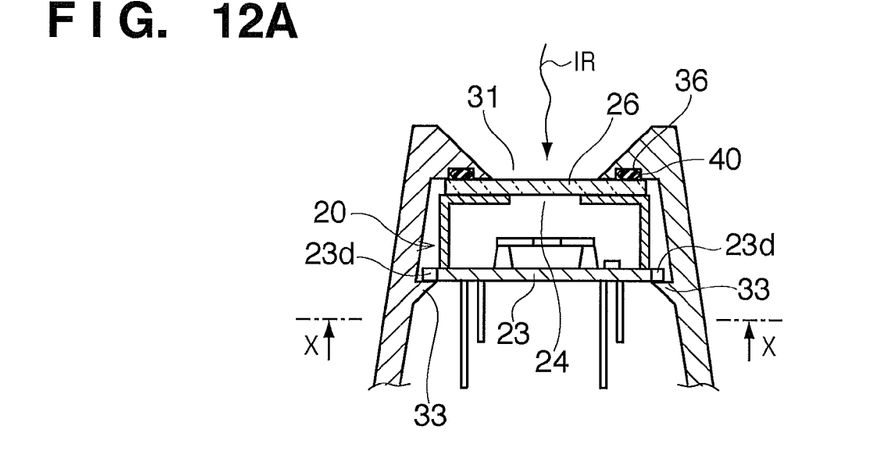
FIGS. 12A and 12B are views for explaining a structure and process for fixing the detection element housing to the probe.
Figure 12B:
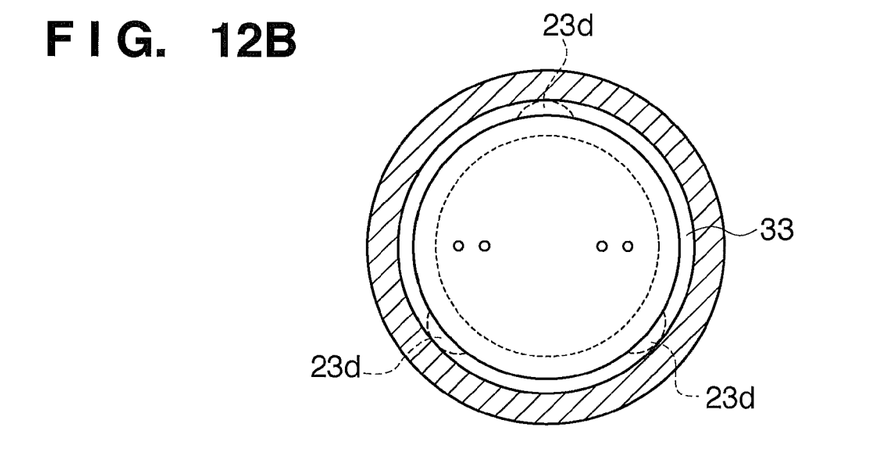

FIGS. 12A and 12B show a state in which the engaging portion 33 is annularly formed along the inner surface, and the three projection portions 23d are formed on the edge portion of the mounting base member 23 at 120° intervals so as to radially extend.

As shown in FIG. 12B, the projection portions 23d are supported by the annular engaging portion 33 formed along the inner surface of a probe 3.

Note that the engaging portion 33 can be integrally formed with the probe 3 or can be formed as a separate member and fixed to the probe 3.

Sixth Embodiment

The third embodiment is configured such that the container member 25 of the detection element housing 20 comes into direct contact with the end face portion 32. However, the present invention is not limited to this.

As in the fourth embodiment, the container member 25 may come into contact with the end face portion 32 through an O-ring as a seal member.

Figure 13:
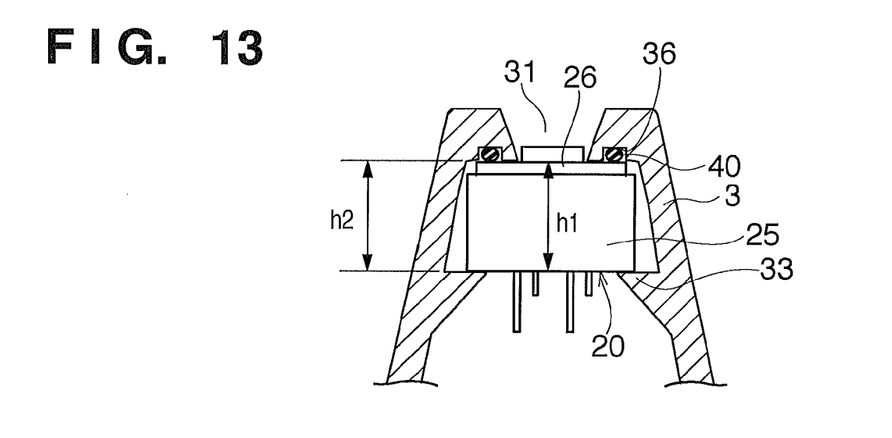
FIG. 13 is a view for explaining a structure and process for fixing the detection element housing to the probe.

FIG. 13 is a view for explaining an attachment process for attaching a detection element housing 20 to a probe 3 through an O-ring so as to close the opening of the distal end of the probe 3. Note that the same reference numerals as in FIG. 13 denote configurations or components in FIG. 13 which have already been described, and a detailed description will be omitted.

Referring to FIG. 13, reference numeral 40 denotes an O-ring (gasket) as a seal member; and 36, a groove portion in which the O-ring 40 is accommodated.

As shown in FIG. 13, while the detection element housing 20 is fixed, the surface of a container member 25 is in contact with the O-ring 40, and hence the O-ring 40 protruding from the groove portion 36 elastically deforms. This makes it possible to hermetically seal a probe 3.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An ear thermometer which incorporates, in a probe, a detection element housing accommodating a temperature detection element configured to detect an environmental temperature and an infrared detection element configured to detect infrared radiation emitted from a temperature measurement region in an earhole and measures a body temperature based on detection results obtained by said two detection elements,
    said probe including an end face portion having an opening and forming a distal end portion, an inner surface portion which is formed by a hollow cylindrical member and forms a side surface portion, and an engaging portion inwardly protruding from said inner surface portion,
    said detection element housing including a mounting base member on which said two detection elements are fixed, a cylindrical container member which includes a hole formed on the opening side to face said infrared detection element, is fixed to said mounting base member, and surrounds said two detection elements, and a window member which is attached to the hole, closes the hole, and transmits infrared radiation,
    wherein one of said window member and said container member of said detection element housing is in contact with an internal surface of said end face portion so as to close the opening of said probe,
    an air layer is formed between an outer surface of said detection element housing and said inner surface portion of said probe by fixing said mounting base member by engaging said mounting base member with said engaging portion,
    the internal surface of said end face portion forms an inner wall portion radially extending from the opening to said inner surface portion,
    said engaging portion is formed by an abutment surface which is formed at one of a position corresponding to a height of an outer surface of said container member and a position corresponding to a sum of a height of the outer surface of said container member and a height of said window member and spaced apart from the inner wall portion, and an inclined surface which is inclined from said inner surface portion to a probe central portion, and when said detection element housing is forcibly inserted into the opening, a surface of one of said window member and said container member comes into contact with the inner wall portion, and a rear surface of said mounting base member engages with the abutment surface.

2. The thermometer according to claim 1, wherein said mounting base member comprises an outer collar portion radially extending from an edge portion of said mounting base member, and a rear surface of said outer collar portion is engaged with the abutment surface of said engaging portion.

3. The thermometer according to claim 2, wherein said outer collar portion has a disk-like shape, said engaging portion comprises at least two engaging portions formed inwardly, and said engaging portion is engaged with a rear surface of said outer collar portion having the disk-like shape.

4. The thermometer according to claim 2, wherein said outer collar portion includes at least two projection portions radially extending, and said engaging portion engaged with the projection portion is continuously formed on the inner surface of said probe.

5. The thermometer according to claim 1, further comprising a main body cover which covers a liquid crystal display device which displays a body temperature measurement result, said main body cover being integrally molded with said probe such that said probe is located on the same side as that of a display surface of said liquid crystal display device.

6. An ear thermometer which incorporates, in a probe, a detection element housing accommodating a temperature detection element configured to detect an environmental temperature and an infrared detection element configured to detect infrared radiation emitted from a temperature measurement region in an earhole and measures a body temperature based on detection results obtained by said two detection elements,
    said probe including an end face portion having an opening and forming a distal end portion, an inner surface portion which is formed by a hollow cylindrical member and forms a side surface portion, and an engaging portion inwardly protruding from said inner surface portion,
    said detection element housing including a mounting base member on which said two detection elements are fixed, a cylindrical container member which includes a hole formed on the opening side to face said infrared detection element, is fixed to said mounting base member, and surrounds said two detection elements, and a window member which is attached to the hole, closes the hole, and transmits infrared radiation,
    wherein one of said window member and said container member of said detection element housing is in contact with an internal surface of said end face portion through a seal member so as to close the opening of said probe,
    an air layer is formed between an outer surface of said detection element housing and said inner surface portion of said probe by fixing said mounting base member by engaging said mounting base member with said engaging portion,
    the internal surface of said end face portion forms an inner wall portion radially extending from the opening to said inner surface portion and including a groove portion in which the seal member is accommodated,
    said engaging portion is formed by an abutment surface which is formed at one of a position corresponding to a height of an outer surface of said container member and a position corresponding to height where amount of elasticity deform takes from sum of a height of the outer surface of said container member and a height of said window member and spaced apart from the inner wall portion, and an inclined surface which is inclined from said inner surface portion to a probe central portion, and when said detection element housing is forcibly inserted into the opening, a surface of one of said window member and said container member comes into contact with the inner wall portion with depressing the seal member, and a rear surface of said mounting base member engages with the abutment surface.

7. The thermometer according to claim 6, wherein the seal member is an O-ring made of a rubber, an elastomer or a metal where shape at cross section is circular, lozenge, C shape or inverted C shape.

8. The thermometer according to claim 6, wherein the seal member is liquid adhesion bond which is inserted into a groove portion so as to equally overflow from the groove portion and gets rigid so as to become sealing material.

9. A method of manufacturing an ear thermometer which incorporates, in a probe, a detection element housing accommodating a temperature detection element configured to detect an environmental temperature and an infrared detection element configured to detect infrared radiation emitted from a temperature measurement region in an earhole and measures a body temperature based on detection results obtained by the two detection elements, the probe including an end face portion having an opening and forming a distal end portion, an inner surface portion which is formed by a hollow cylindrical member and forms a side surface portion, and an engaging portion inwardly protruding from the inner surface portion, the detection element housing including a mounting base member on which the two detection elements are fixed, a cylindrical container member which includes a hole formed on the opening side to face the infrared detection element, is fixed to the mounting base member, and surrounds the two detection elements, and a window member which is attached to the hole, closes the hole, and transmits infrared radiation, wherein one of the window member and the container member of the detection element housing is in contact with an internal surface of the end face portion so as to close the opening of the probe, an air layer is formed between an outer surface of the detection element housing and the inner surface portion of the probe by fixing the mounting base member by engaging the mounting base member with the engaging portion, the internal surface of the end face portion forms an inner wall portion radially extending from the opening to the inner surface portion, the engaging portion is formed by an abutment surface which is formed at one of a position corresponding to a height of an outer surface of the container member and a position corresponding to a sum of a height of the outer surface of the container member and a height of the window member and spaced apart from the inner wall portion, and an inclined surface which is inclined from the inner surface portion to a probe central portion, and when the detection element housing is forcibly inserted into the opening, a surface of one of the window member and the container member comes into contact with the inner wall portion, and a rear surface of the mounting base member engages with the abutment surface.

10. The method according to claim 9, wherein the mounting base member comprises an outer collar portion radially extending from an edge portion of the mounting base member, and a rear surface of the outer collar portion is engaged with the abutment surface of the engaging portion.

11. The method according to claim 10, wherein the outer collar portion has a disk-like shape, the engaging portion comprises at least two engaging portions formed inwardly, and the engaging portion is engaged with a rear surface of the outer collar portion having the disk-like shape.

12. The method according to claim 9, wherein the outer collar portion includes at least two projection portions radially extending, and an engaging portion engaged with the projection portion is continuously formed on the inner surface of the probe.

13. The method according to claim 9, wherein the ear thermometer further comprises a main body cover which covers a liquid crystal display device which displays a body temperature measurement result, and the main body cover is integrally molded with the probe such that the probe is located on the same side as that of a display surface of the liquid crystal display device.

* * * * *